United States Patent
Koschel

(10) Patent No.: US 11,156,204 B2
(45) Date of Patent: Oct. 26, 2021

(54) WIND TURBINE

(71) Applicant: NAVIKOM ANDRZEJ KOSCHEL, Poznan (PL)

(72) Inventor: Andrzej Koschel, Poznan (PL)

(73) Assignee: NAVIKOM ANDRZEJ KOSCHEL, Poznan (PL)

( * ) Notice: Subject to any disclaimer, the term of this patent is extended or adjusted under 35 U.S.C. 154(b) by 0 days.

(21) Appl. No.: 17/235,863

(22) Filed: Apr. 20, 2021

(65) Prior Publication Data

US 2021/0239088 A1 Aug. 5, 2021

Related U.S. Application Data

(63) Continuation of application No. PCT/EP2019/078768, filed on Oct. 22, 2019.

(30) Foreign Application Priority Data

Oct. 22, 2018 (EP) .................... 18201874

(51) Int. Cl.
*F03D 1/06* (2006.01)
*F03D 9/25* (2016.01)
*F03D 3/02* (2006.01)

(52) U.S. Cl.
CPC ............ *F03D 1/0675* (2013.01); *F03D 3/02* (2013.01); *F03D 9/25* (2016.05); *F05D 2240/30* (2013.01)

(58) Field of Classification Search
CPC .......... F03D 1/06; F03D 1/0675; F03D 1/065; F03D 9/25; F03D 3/02; F03D 3/04; F05D 2240/30
See application file for complete search history.

(56) References Cited

U.S. PATENT DOCUMENTS 7,605,491 B1* 10/2009 Chung .................. F03D 3/0409
290/55
8,734,084 B1* 5/2014 Lovas ....................... F03D 5/06
415/4.2

(Continued)

FOREIGN PATENT DOCUMENTS

DE 212014000161 U1 3/2016
FR 2281508 A1 3/1976
WO 2014035036 A1 3/2014

OTHER PUBLICATIONS

International Search Report issued by the International Searching Authority for corresponding International Patent Application No. PCT/EP2019/078768, dated Feb. 18, 2020.

(Continued)

*Primary Examiner* — Igor Kershteyn
*Assistant Examiner* — Joshua R Beebe
(74) *Attorney, Agent, or Firm* — Myers Wolin, LLC

(57) ABSTRACT

A wind turbine (100) comprising a turbine generator (101), rotating mast (102) and a bedplate (103) which is the foundation of the turbine, and three vertical airfoils (104, 105) positioned parallel forming a diffuser, where two of them are side airfoils (104) and the third one, which is positioned in an equal distance between the side airfoils (104), is the central airfoil (105), wherein three vertical airfoils (104, 105) have cross-section diminishing upwardly and the central airfoil (105) comprises in its leeward area a mounted turbine generator (101) having at least one rotor connected to at least one electric generator, wherein said turbine generator (101) is located inside the central airfoil (105), the central airfoil (105) in its cross-section has a shape of biconvex airfoil section preferably drop-shaped.

11 Claims, 5 Drawing Sheets

(56) References Cited

U.S. PATENT DOCUMENTS

| 9,115,685 B2* | 8/2015 | Ross .................. F03B 17/063 |
| 2011/0103942 A1 | 5/2011 | Green et al. |
| 2012/0107085 A1* | 5/2012 | McCowan ........... F03D 3/0427 |
| | | 415/1 |
| 2013/0170986 A1* | 7/2013 | Steel ..................... F03D 9/34 |
| | | 416/5 |

OTHER PUBLICATIONS

European Search Report, dated Apr. 18, 2019, issued in corresponding European Patent Application No. EP 18201874, 2 pages.

* cited by examiner

WIND TURBINE

CROSS REFERENCE TO RELATED APPLICATIONS

This application is a continuation under 35 U.S.C. § 120 of International Application PCT/EP2019/078768, filed Oct. 22, 2019, which claims priority to European Application No. 18201874.7, filed Oct. 22, 2018, the contents of each of which are incorporated by reference herein.

FIELD OF THE INVENTION

The present solution relates to a wind turbine with a horizontal or vertical rotor axis of rotation depending on the on the power of the device.

BACKGROUND

The Chinese patent CN103573553 presents a wind turbine comprising a rotating shaft embedded with a bearing at the bottom in the form of a disk. Furthermore, the said rotating shaft is connected to the bars which support the V-shaped blades. This solution allows for adjusting the inclination angle of the blades to the wind blowing on the turbine.

Furthermore, the Korean patent KR101114015 describes a device for generating energy from wind power. This device includes a shaft for guiding a streamline blade within a range defined by a groove guiding the element to the blade lead. This device is also equipped with elements for directing the wind which are acting as a diffuser.

A U.S. patent application US20160138567 describes a wind turbine for generating electricity with a horizontal axis of rotation with a turbine assembly mounted on the inner support placed in an aerodynamic fairing. The turbine assembly may contain a drop-shaped generator having a rotor shaft that can be rotated about the axis of the rotation of the blades using the rotor blades extending radially in the direction away from the rotor.

A U.S. patent application US2011103942 A1 discloses a wind energy system comprising a wind accelerator having a support assembly and an outer structure surrounding the support assembly. The wind accelerator has a front region and a rear region. The rear region is substantially wider than the front region, and the outer structure tapers from the rear region to the front region. One or more turbines are mounted on the support assembly at or near the rear region of the wind accelerator or at or near the widest point of the wind accelerator.

A French patent application FR2281508A1 discloses a turbine in an airstream with the turbine having a rotor with a plurality of blades and a stator with a plurality of blades upstream of the rotor. A portion of the ambient airstream is increased in velocity and reduced in pressure by passing such portion of the ambient airstream through the stator to provide an incoming airstream. The incoming airstream is passed through the rotor to drive the rotor and to provide an exiting airstream. The exiting airstream is conducted through a duct to increase the pressure and decrease the velocity of the exiting airstream, and subsequently the exiting airstream is discharged from the duct to the atmosphere.

Due to the global trend to use renewable energy resources, there is a need to develop a wind turbine with a design that will increase its efficiency as compared to the existing solutions while ensuring it is not burdensome for the public.

SUMMARY

A wind turbine comprising a turbine generator, a rotating mast, a bedplate which is the foundation of the turbine and three vertical airfoils positioned parallel forming a diffuser where two of them are side airfoils and the third one, which is positioned in an equal distance between the side airfoils, is the central airfoil wherein three vertical airfoils have cross-section diminishing upwardly and the central airfoil comprising in its leeward area a mounted turbine generator having at least one rotor connected to at least one electric generator, wherein said turbine generator is located inside the central airfoil. The central airfoil in its cross-section has a shape of biconvex airfoil section preferably drop-shaped, while the side airfoils in their cross-sections have the shape of an asymmetrical plane-convex airfoil section. The side airfoils are connected to the central airfoil with arms preferably positioned in the V shape. Between the side airfoils and the central airfoil there are adjustable curtains attached to the arms. The central airfoil also comprises in its leeward side area inlet openings for intercepting the wind stream directed through the side airfoils, adjustable curtains, and at least one diffuser directing the wind stream from inlet openings onto the rotor of turbine generator. The inlet openings are preferably covered with a polyamide or polypropylene mesh.

Preferably, the bedplate cover, side airfoils, central airfoil, arms and/or diffuser directing the wind stream from the inlet openings to the generator rotor are made of sandwich composites in a polyester-glass laminate.

Preferably, the adjustable curtain is in the form of a Dacron sheet or permanent louvers made of sandwich composites of polyester-glass laminate.

Preferably, the side airfoils and/or the central airfoil are connected to the arms separately, preferably with screws.

Preferably, the wind turbine is equipped with an anemometer.

Preferably, the wind turbine comprises an electronic controller for controlling the adjustable curtains.

Preferably, the turbine generator is equipped with a rotor with vertical axis rotation supported on two cone bearings connected by a hub to the electric generator.

Preferably, the wind turbine has pins mounted to the bedplate which are anchored in the ground, preferably they are at least 60 cm long.

The turbine generator of turbines with a power exceeding 500 kW is preferably equipped with at least two rotors with a horizontal axis of rotation connected by hubs with electric generators.

Preferably, the diffuser directing the wind stream from the inlet openings to the rotor of turbine generator is in the form a spoiler attached to the inner surface of the central wall of the central airfoil.

The construction of the wind turbine, according to the invention, allows for increased concentration of kinetic energy of the wind stream directed towards its rotor.

The solution, according to the invention, by means of the diffusers used, allows for increased speed of the wind stream flow through the turbine which in turn allows for more efficient use of energy of the wind stream on a given work surface of the turbine in relation to the conventional solutions. The construction of the wind turbine, according to the invention, allows for at least ten-fold increase of the speed of the wind stream flow.

The use of airfoils with the upwardly diminishing cross-section, preferably drop-shaped, in the turbine reduces turbulence and disruptions of the external wind stream flow.

The wind turbine, according to the invention, can operate within the speed ranging from 2 m/s to 30 m/s which increases the energy efficiency of the turbine in relation to conventional designs and which is impossible with classic horizontal turbines.

In the wind turbine, according to the invention, the use of adjustable curtains makes it possible to adjust its working surface which prevents technical failures and damage to the device in case of extremely strong winds with speeds of more than 41 m/s.

The use of a rotating mast and the side airfoils allows for the turbine to self-align with the wind.

Furthermore, the wind turbines, according to the invention, have a wide range of power depending on the working surface. It ranges from 10-50 kW to 200, 600, and even 1200 kW.

The described wind turbine is made almost entirely from sandwich composites in a polyester—glass laminate which makes it lighter from the commonly used designs and gives is durability in exploitation while characterized by low production costs.

Furthermore, the wind turbine, according to the invention, does not generate noise due to sound emission below 30 dB, as well as it does not emit infrasounds and the so-called flickering which can be annoying to the public.

Additionally, due to the fact that the turbine generator is completely covered, the turbine is safe for animals such as birds or bats, and so it does not have a negative impact on the environment.

The wind turbine, according to the invention, does not require the use of foundations which allows for reduction of moving costs and makes it possible to install it on residential buildings, utility buildings such as, for example, petrol stations. The turbine can also be used as a portable electric generator for irrigation of crops or as an ancillary power on ships.

The side airfoils and the central airfoil are connected with the arms separately which simplifies transport, assembly, disassembly, and service access.

BRIEF DESCRIPTION OF THE DRAWING

The present invention will be explained in more detail hereinafter on the basis of several preferred exemplary embodiments illustrated in the drawing, wherein.

DETAILED DESCRIPTION OF THE PREFERRED EMBODIMENTS

Embodiment 1

Figure 1:
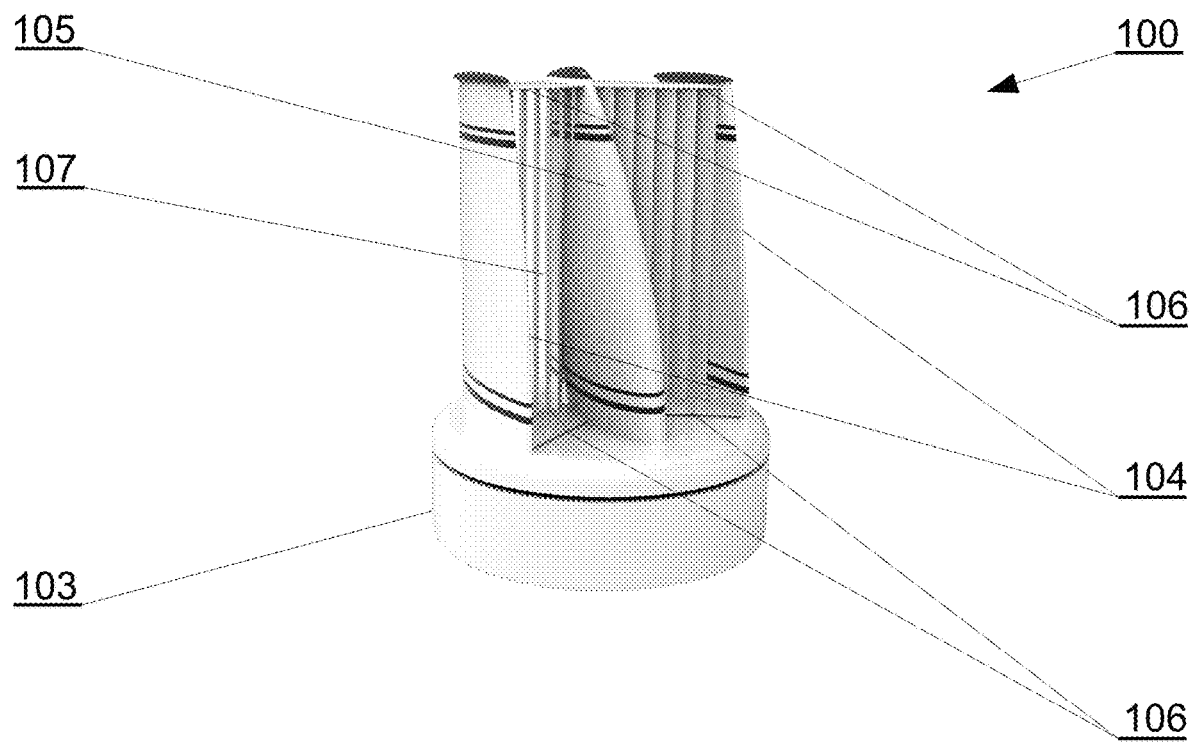
FIG. 1 shows the wind turbine, according to the disclosure, in a perspective view from the windward side.
Figure 2:
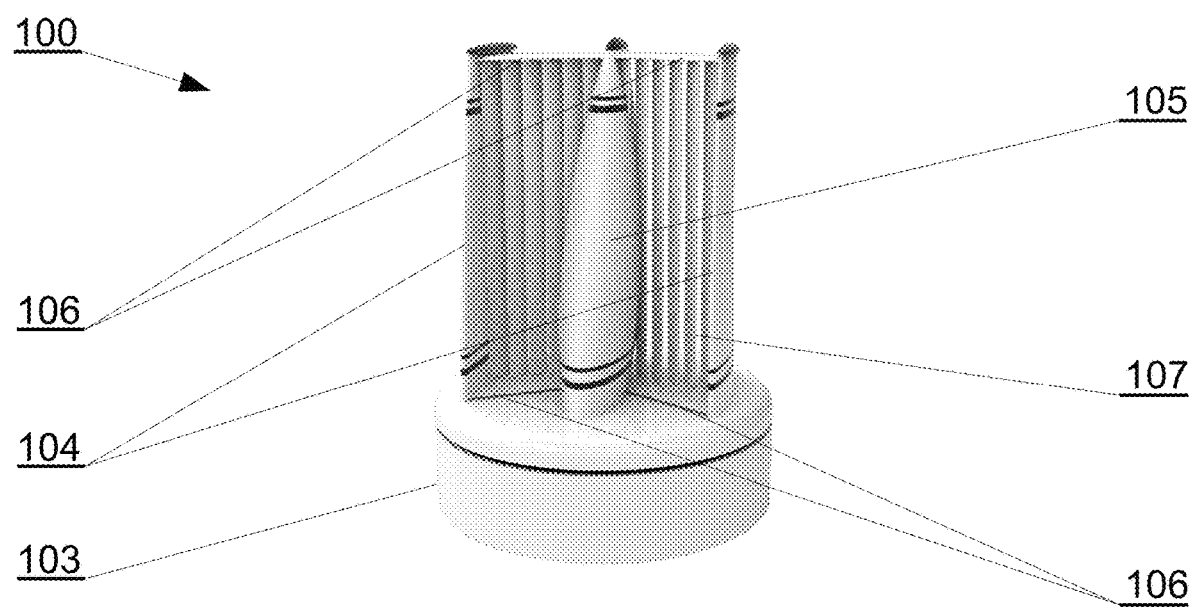
FIG. 2 shows the wind turbine, according to the disclosure, in another perspective view from the windward side.
Figure 3:
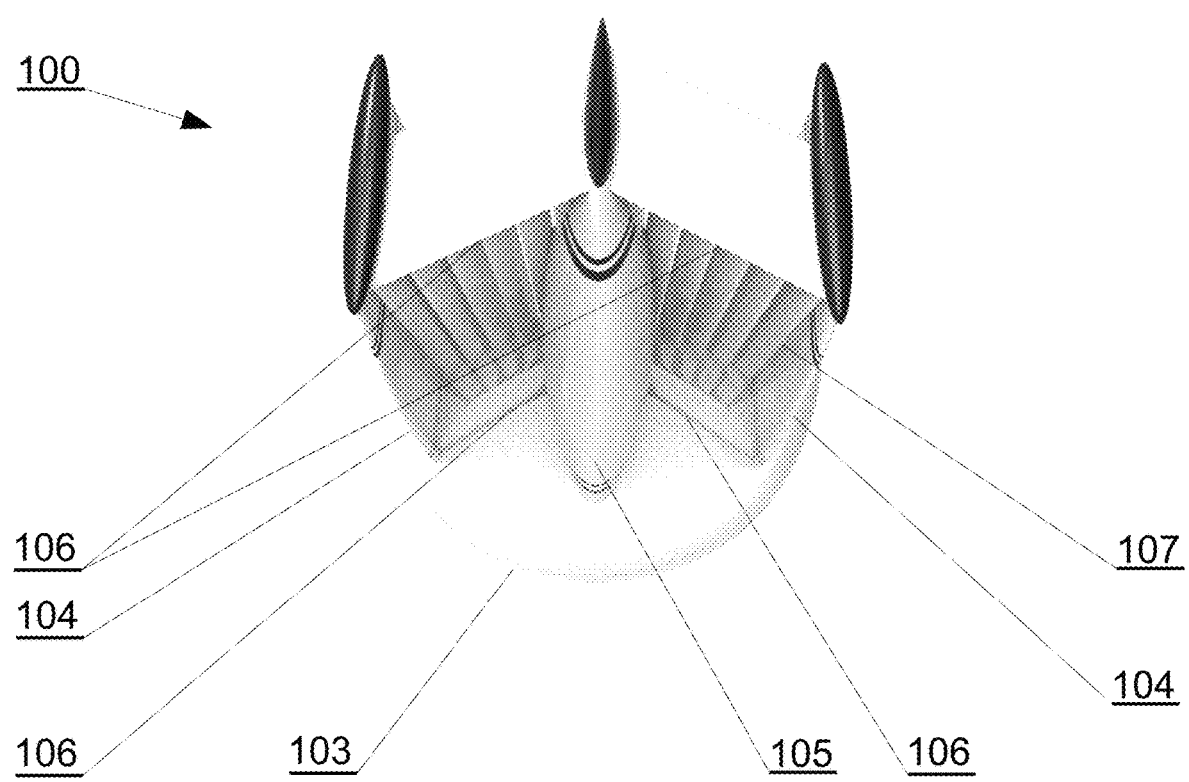
FIG. 3 shows the wind turbine, according to the disclosure, in a top view.
Figure 4:
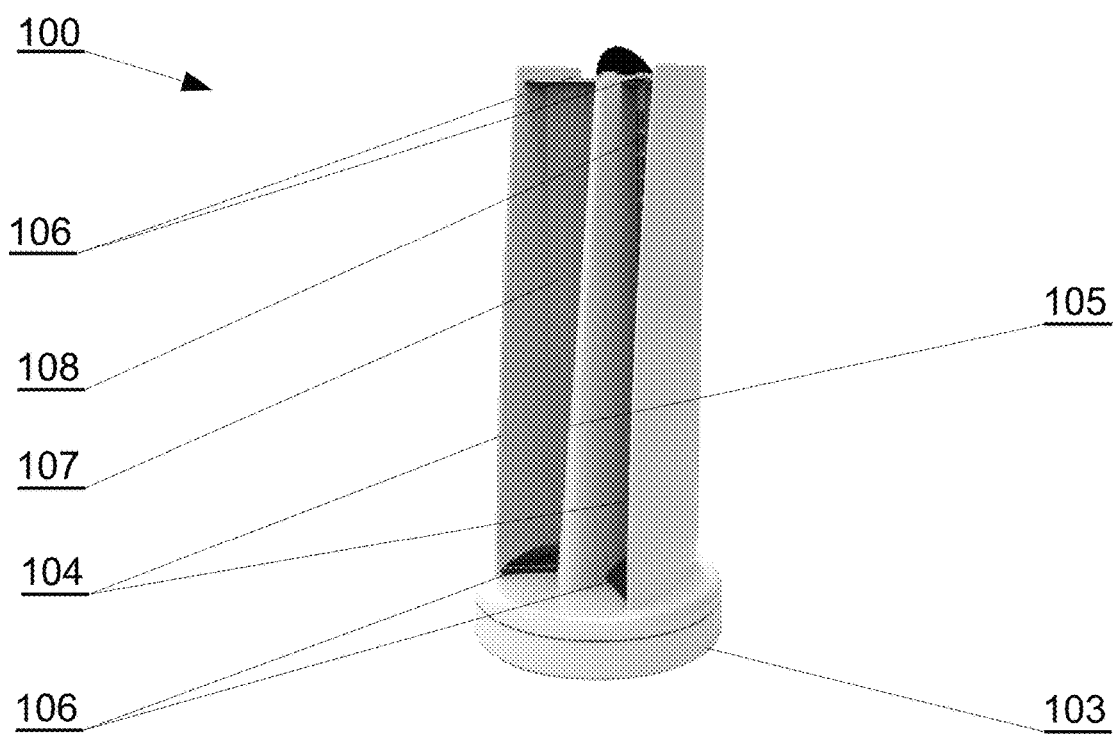
FIG. 4 shows the wind turbine, according to the disclosure, in the perspective view from the windward side with visible inlet openings.
Figure 5:
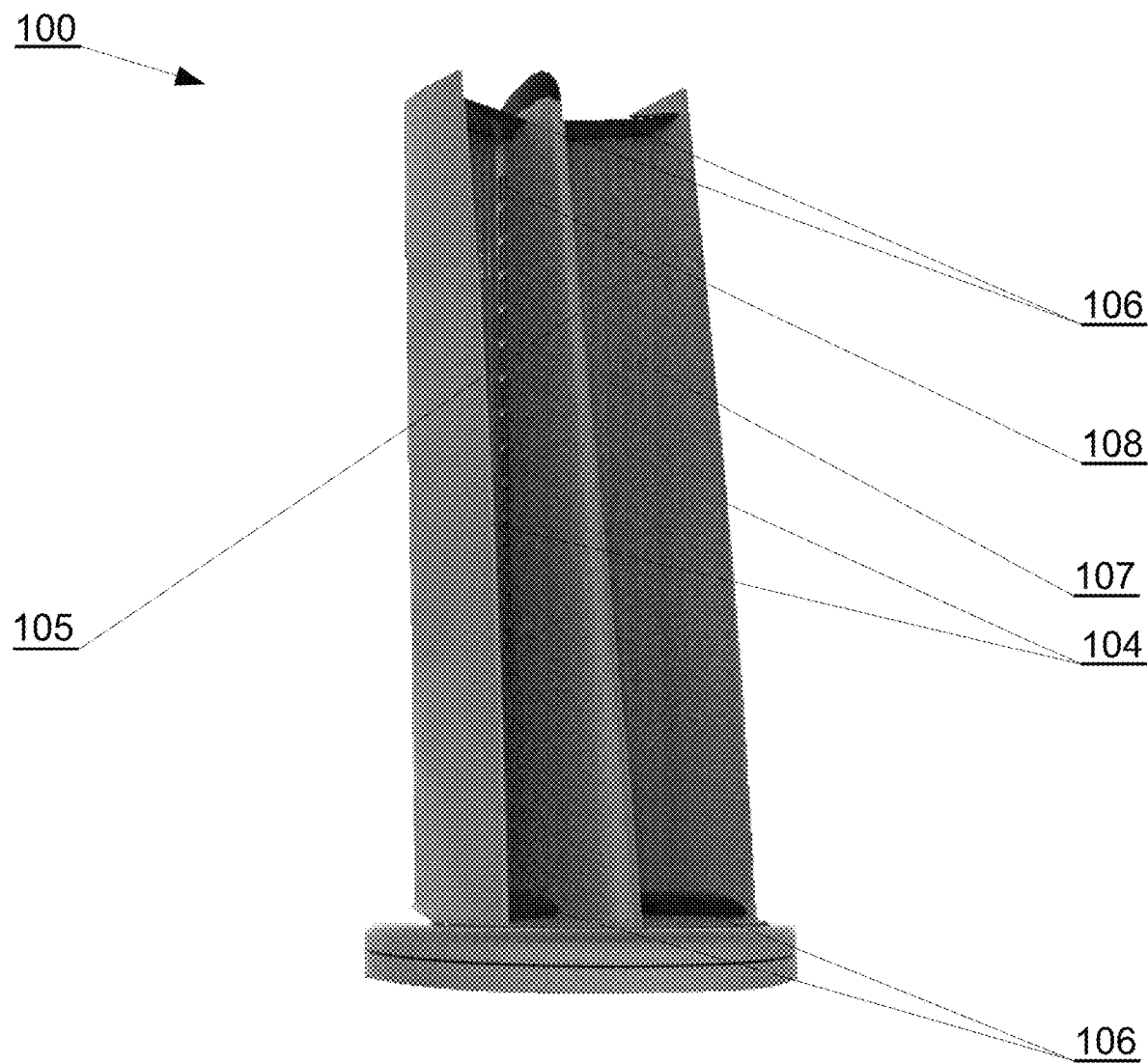
FIG. 5 shows the wind turbine, according to the disclosure, in another perspective view from the windward side with visible inlet openings.
Figure 6:
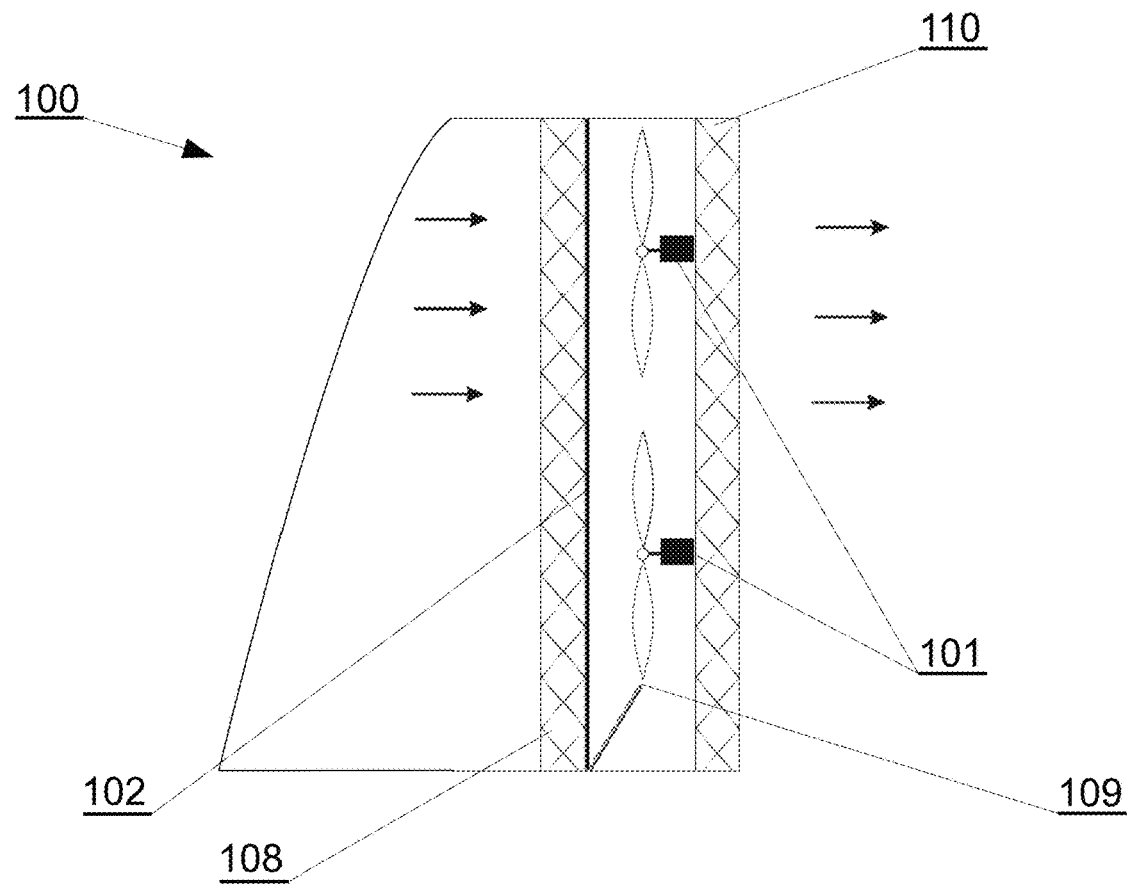
FIG. 6 shows the wind turbine, according to the disclosure, with a horizontal axis of rotation in longitudinal section.
Figure 7:
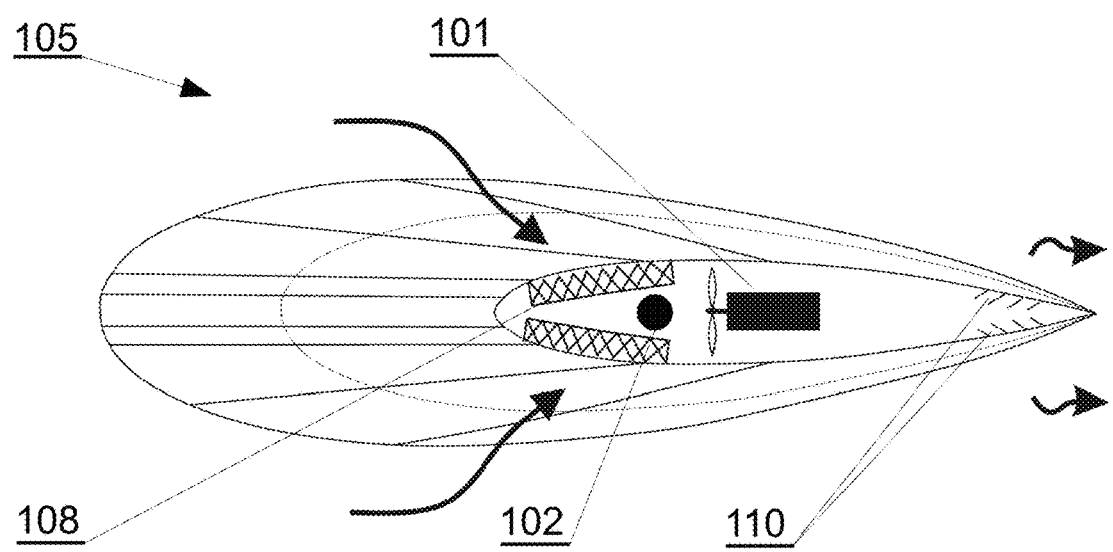
FIG. 7 shows the central airfoil of the wind turbine, according to the disclosure, with a horizontal axis of rotation in cross-section.
Figure 8:
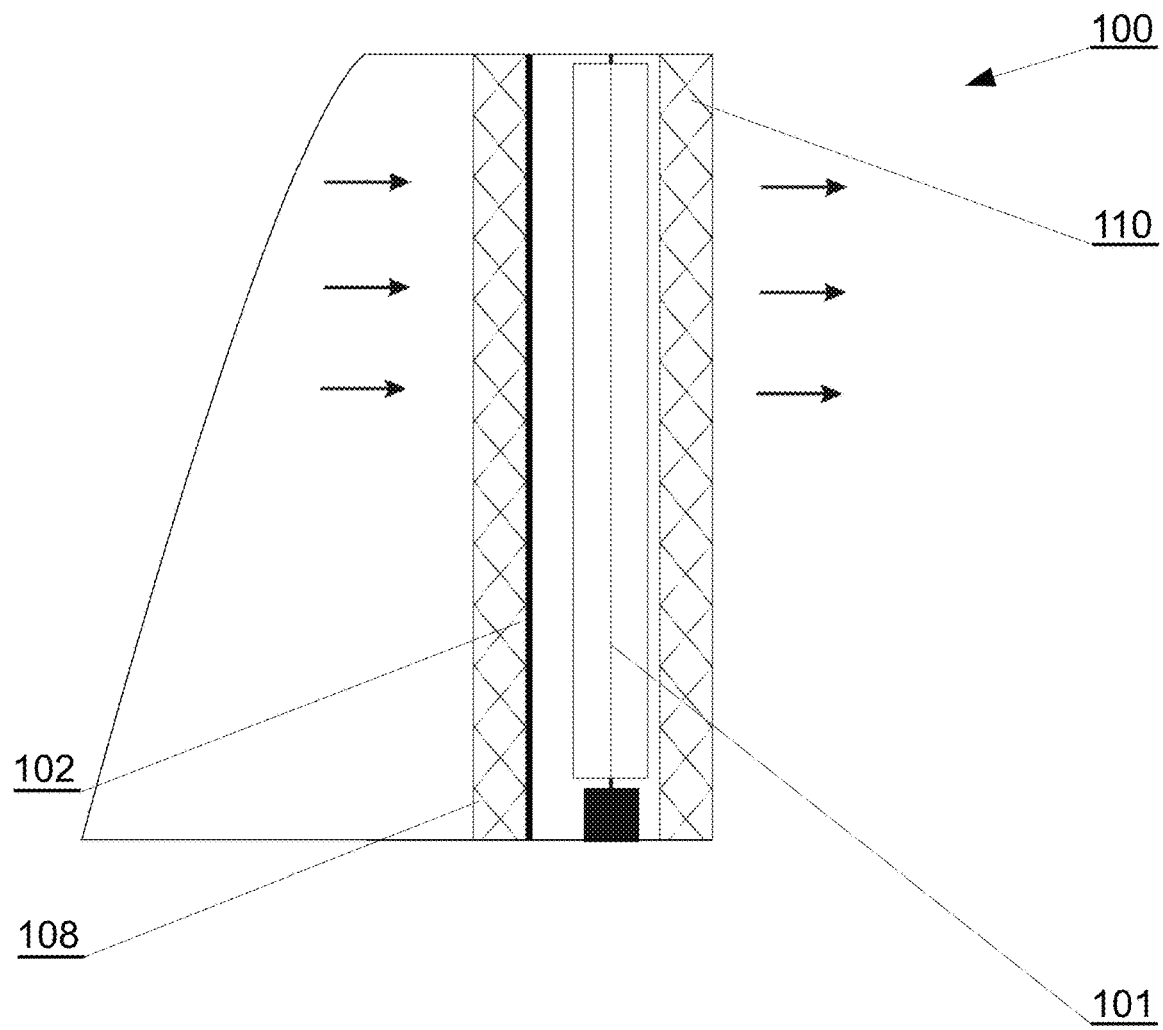
FIG. 8 shows the wind turbine, according to the disclosure, with a vertical axis of rotation in longitudinal section.
Figure 9:
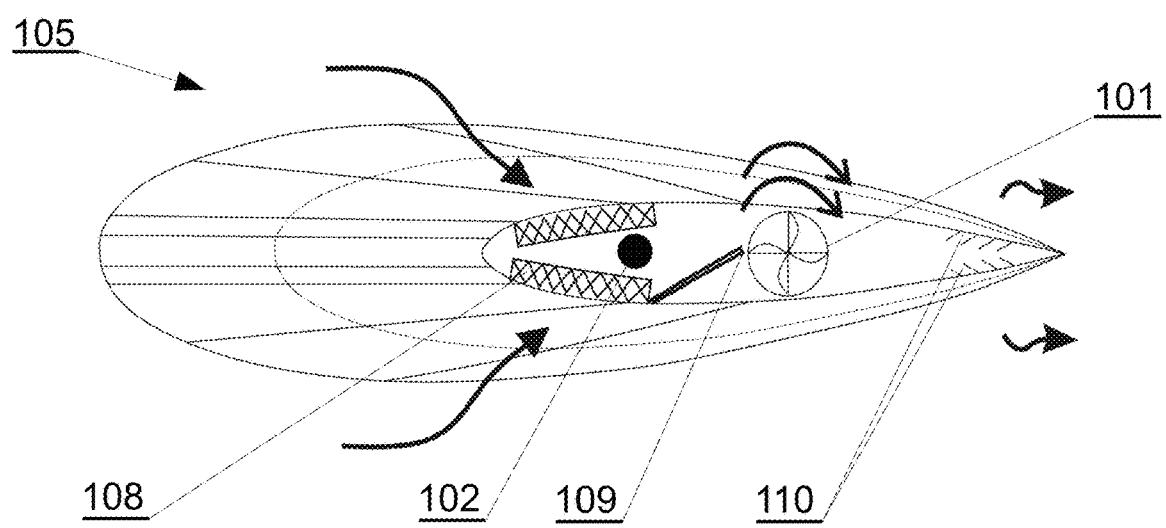
FIG. 9 shows the central airfoil of the wind turbine, according to the disclosure, with a horizontal axis of rotation in cross-section.

A wind turbine 100 with the power of up to 500 kW, comprising three vertical airfoils 104, 105 positioned parallel with cross-section diminishing upwardly forming a diffuser. Two of them are side airfoils 104, while the third one, which is positioned centrally between the side airfoils, is the central airfoil 105.

The central airfoil 104 of the turbine 100 has in its cross-section a shape of biconvex airfoil section preferably drop-shaped while the side airfoil 104 in their cross-sections have the shape of an asymmetrical plane-convex airfoil section.

The side airfoils 104 are connected to the central airfoil 105 with hollow profile arms 106 made of sandwich composites in a polyester-glass laminate positioned in a V-shape. The side airfoils 104 and the central airfoil 105 are connected with arms 106 detachably with the use of screws preferably having the M10 thread which simplifies transport, assembly, disassembly, and service access.

The turbine 100 also comprises adjustable curtains in the form of Dacron sheets 107 placed between the side airfoils 104 and the central airfoil 105. The curtains 107 are attached to rails placed on the arms 106. The curtains 107 are rolled up when wind exceeds the critical value of 41 m/s. This way, the wind turbine 100 is protected from overload and possible damage. The curtain is rolled up similar to the way sails are rolled up and is controlled by an electronic controller based on the anemometer indications.

The central airfoil 105 is made of sandwich composites in a polyester-glass laminate and it is drop-shaped in its cross-section. Inside the central airfoil 105 in its leeward area it comprises a mounted turbine generator 101 which is a rotor with vertical axis rotation supported on two cone bearings connected by a hub to the electric generator converting kinetic energy into electricity.

The central airfoil 105 comprises in its leeward side area inlet openings 108 for intercepting the wind stream directed through the side airfoils 104, adjustable curtains 107, and a diffuser 109 in the form of a spoiler directing the wind stream from inlet openings 108 onto the rotor of turbine generator 101.

The inlet openings 108 are covered with a polyamide mesh which prevents birds, bats, leaves and other similar things from falling inside the central airfoil 105, thus protecting the generator.

The central airfoil 105 is mounted on a steel rotating mast 102 connected to a bedplate 103 through a bearing hub using screws preferably with M10 thread. The bedplate 103 is made from steel and serves as the foundation of the entire structure. The bedplate 103 is enclosed by a sheath made of sandwich composites in a polyester-glass laminate. The bedplate 103 has 60 cm long pins attached to it for anchoring the turbine in the ground.

The turbine works in such a way that the air mass (wind) which pushes on the wind turbine 100 is directed with the adjustable curtains 107 and the diffuser in the form of the side airfoils 104 and the central airfoil 105 in the direction of the inlet openings 108 placed on the side area of the leeward part of the central airfoil 105. The inlet openings 108 intercept the wind stream which is then guided by the diffuser 109 placed in the central airfoil 105 to the rotor of turbine generator 101, then the wind stream leaves the central airfoil through the outlet openings 110.

The system of diffusers and curtains used in the turbine allows for an increased speed of the wind stream flow through the turbine which in turn allows for more efficient use of energy of the wind stream on a given work surface of the turbine in relation to the conventional solutions.

Embodiment 2

The wind turbine with a power exceeding 500 kW comprising three vertical airfoils 104, 105 positioned parallel with cross-section diminishing upwardly forming a diffuser. Two of them are side airfoils 104, while the third one, which is positioned centrally between the side airfoils 104, is the central airfoil 105.

The central airfoil 105 in its cross-section has a shape of biconvex airfoil section preferably drop-shaped while the side airfoils 104 in their cross-sections have the shape of an asymmetrical plane-convex airfoil section.

The side airfoils 104 are connected to the central airfoil 105 with hollow profile arms 106 made of sandwich composites in a polyester-glass laminate positioned in a V-shape. The side airfoils 104 and the central airfoil 105 are connected with arms 106 separately with the use of screws preferably having the M10 thread which simplifies transport, assembly, disassembly, and service access.

The turbine 100 also comprises adjustable curtains 107 in the form of permanent louvers made of sandwich composites in polyester-glass laminate placed between the side airfoils 104 and the central airfoil 105. The permanent louvers are attached the arms 106 in the way that allows them to rotate about their own axis. When the wind exceeds the critical value of 41 m/s, the safeguard system in the form of an electromagnet holding the louvers of the adjustable curtains 107 in a fixed position is unblocked thus allowing the wind stream to flow freely. The safeguard in the form of an electromagnet is controlled by an electronic controller based on the anemometer indications. This is how the wind turbine 100 protected from overload and possible damage.

The central airfoil 105 is made of sandwich composites in a polyester-glass laminate and it is drop-shaped in its cross-section. Inside the central airfoil 105 in its leeward area it comprises a mounted turbine generator 101 converting kinetic energy into electricity and having two rotors with a horizontal axis of rotation mounted with hubs to one or two electric generators. The electric generators are located in the lower part of the central airfoil 105. When two generators are used, the power of the entire wind turbine 100 is transferred hydraulically or mechanically to the lower area of the central airfoil 105. The central airfoil 105 comprises in its leeward side area inlet openings 108 for intercepting the wind stream directed through the side airfoils 104, adjustable curtains 107, and a diffuser 109 directing the wind stream from inlet openings 108 onto the rotor of turbine generator 101, at which point the wind stream leave the central airfoil through the outlet openings 110.

The inlet openings 108 are covered with a polypropylene mesh which prevents birds, bats, leaves and other similar things from falling inside the central airfoil 105, thus protecting the generator.

The central airfoil 105 is mounted on a steel rotating mast 102 connected to a bedplate 103 through a bearing hub using screws preferably with M10 thread. The bedplate 103 is made from steel and serves as the foundation of the entire structure. The bedplate 103 is enclosed by a sheath made of sandwich composites in a polyester-glass laminate.

The principle of operation of the turbine has been described in Embodiment 1.

What is claimed is:

1. A wind turbine (100) comprising a turbine generator (101), a rotating mast (102) and a bedplate (103) which is the foundation of the turbine, and three vertical airfoils (104, 105) positioned parallel forming a diffuser, where the two outer of them airfoils are side airfoils (104) and the third airfoil one, which is positioned in an equal distance between the side airfoils (104), is the a central airfoil (105), wherein the three vertical airfoils (104, 105) have cross-sections diminishing upwardly and the central airfoil (105) comprises in its leeward area a mounted turbine generator (101) having at least one rotor connected to at least one electric generator, wherein said turbine generator (101) is located inside the central airfoil (105), wherein the central airfoil (105) in its cross-section has a shape of a drop-shaped biconvex airfoil section preferably drop-shaped while the side airfoils (104) in their cross-sections have the shape of an asymmetrical plane-convex airfoil section, the side airfoils (104) are connected to the central airfoil (105) with arms (106) preferably positioned in the V shape, between the side airfoils (104) and the central airfoil (105) there are a plurality of adjustable curtains (107) attached to the arms (106), while the central airfoil (105) also comprises in its leeward side, a plurality of area inlet openings (108) for intercepting a wind stream directed through the side airfoils (104) and the plurality of adjustable curtains (107), and at least one diffuser (109) directing the wind stream from the plurality of inlet openings (108) onto the rotor of the turbine generator (101).

2. The wind turbine according to claim 1, wherein the plurality of inlet openings (108) are covered with a polyamide or polypropylene mesh.

3. The wind turbine according to claim 1, wherein a sheath of the bedplate (103), the side airfoils (104, the central airfoil (105), the arms (106) and the diffuser (109) which guide the wind stream from the plurality of inlet openings (108) onto the generator rotor are made of sandwich composites in a polyester-glass laminate.

4. The wind turbine according to claim 1, wherein the curtain (107) is in the form of a Dacron PTE plastic sheet or permanent louvers made of sandwich composites in a polyester-glass laminate.

5. The wind turbine according to claim 1, wherein the side airfoils (104) and the central airfoil (105) are connected with to the arms (106) detachably, with by a plurality of screws.

6. The wind turbine according to claim 1, wherein the turbine is equipped with an anemometer.

7. The wind turbine according to claim 1, wherein the turbine comprises an electronic controller for controlling the plurality of adjustable curtains (107).

8. The wind turbine according to claim 1, wherein the turbine generator (101) is equipped with a rotor with vertical axis rotation supported on two cone bearings connected by a hub to the electric generator.

9. The wind turbine according to claim 1, wherein the turbine has a plurality of pins mounted to the bedplate (103) which are anchored in the ground, the plurality of pins being at least 60 cm long.

10. The wind turbine according to claim 1, wherein in the case of a turbine with a power exceeding 500 kW, the turbine generator (101) is equipped with at least two rotors with a horizontal axis of rotation, each of the at least two rotors being connected by a hub and at least one of the electric generators.

11. The wind turbine according to claim 1, wherein the diffuser (109) is in the form a spoiler attached to the inner surface of the a central wall of the central airfoil (105).

* * * * *